United States Patent Office 3,694,395
Patented Sept. 26, 1972

3,694,395
SECONDARY ALKYL ARYL PHOSPHITES
Peter James Stratford Bain, 12 Maesmawr Road, and Ernest Bryson McCall, Penrhos, Dinbren Road, both of Llangollen, Wales
No Drawing. Filed Dec. 15, 1969, Ser. No. 885,259
Claims priority, application Great Britain, June 5, 1969, 28,472/69
Int. Cl. C08d 7/10
U.S. Cl. 260—29.7 P                     9 Claims

ABSTRACT OF THE DISCLOSURE

Novel aryl phosphites with secondary alkyl groups in the benzene ring are disclosed. The phosphites are stabilizers for synthetic rubber and are particularly suited for latex applications. The new stabilizers are low viscosity liquids having excellent hydrolytic stability.

Field of the invention

This invention relates to compositions containing phosphites that are useful as stabilizers in synthetic rubbers, and to certain of the phosphites that are new compositions of matter.

Most unvulcanized synthetic rubbers undergo deterioration on storage unless a protective agent or stabilizer is added, and in many instances the deterioration is characterized by the formation of gel, that is regions in a rubber which have become hard and where rubbery properties have been lost. Gel formation can sometimes be observed as the hardening and cracking of the surface of a rubber. It has previously been proposed to use organic phosphites as stabilizers for synthetic rubber, and materials such as tris(nonylphenyl)phosphite in which the nonyl group is derived from propylene trimer have been extensively used for this purpose commercially. A drawback of this material and the related alkylphenyl or phenyl phosphites proposed hitherto, however, is that they have a relatively low resistance to hydrolysis. This fact is of significance in that in the commercial production of synthetic rubber the stabilizer is ordinarily incorporated into an aqueous latex prior to coagulation and drying of the rubber, and for adequate compatibility with and distribution throughout the latex, the stabilizer is itself formulated as an aqueous emulsion. A principal consequence of the low hydrolytic stabilities of the conventional phosphites is that the stabilizer emulsion cannot be stored for any appreciable period before use, or conversely, any emulsion that cannot be used within a relatively short time is wasted. The observed effect of hydrolysis of the phosphite is phase separation of the emulsion.

Various modifications of the simple phenyl and alkylphenyl phosphites have been suggested with a view to providing stabilizers having improving hydrolytic stability. While in some cases an improvement can be shown, the products are often liquids having undesirably high viscosity which makes the formulation of satisfactory emulsions difficult.

We have now found a group of phosphites having improved hydrolytic stability compared with the previously known alkyl phenyl phosphites and which are liquids of such mobility that they are readily emulsified.

SUMMARY OF THE INVENTION

Accordingly, the present invention provides an aqueous emulsion comprising a phosphite ester characterized by the presence in the molecule of an alkylphenyl group of the formula

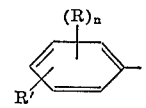
(I)

linked through an oxygen atom to a phosphorus atom, where R is an alkyl group containing from 6 to 12 carbon atoms that is attached at a secondary carbon atom to the benzene nucleus but is otherwise free of branching in the carbon chain, $n$ is 1, 2 or 3, and R' represents a hydrogen atom or an alkyl group of from 1 to 3 carbon atoms.

In preferred phosphites, the molecule contains at least two such alkylphenyl groups, and a typical class can be represented by the general formula

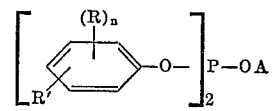
(II)

where A is a phenyl or alkylphenyl group, preferably an alkylphenyl group having Formula I above or a group having the formula

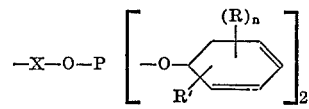
(III)

where B is a phenylene or naphthylene group or a radical comprising two benzene nuclei linked directly or through an intermediate atom or group, for example an oxygen or sulfur atom or through an alkylene, alkylidene, carbonyl or sulfonyl group and each oxygen atom in the grouping —O—X—O— is linked to a nuclear carbon atom of X, and R, $n$ and R' have the same significance as before.

The preferred compounds are the tris(alkylphenyl) phosphites in which each alkylphenyl group has Formula I, and compounds of Formula II where A has the Formula III and B represents a 4,4'-isopropylidenebis(phenylene) radical.

While individual compounds containing the alkylphenyl group which characterizes the stabilizers of the present invention can be used, it is more economic to produce and use stabilizers that are mixtures of different phosphites. Such mixtures may contain compounds that differ in respect of the value of $n$; for example while $n$ in individual compounds is 1, 2 or 3, the average value of $n$ is typically between 1 and 2.

In addition to being mixtures of compounds having different values of $n$, the stabilizers may also contain compounds which differ in respect of the number of carbon atoms in the alkyl group R, the average number of carbon atoms in R or each R being from 6 to 12. Mixtures useful as stabilizers can contain compounds having R groups containing fewer than 6 or more than 12 carbon atoms, but such groups should, in general, each constitute not more than 10% by weight of the total alkyl groups R in the mixture. The location of the secondary carbon atom by which an alkyl group R is attached to the benzene nucleus is not critical, and the phosphites of the invention usually contain compounds which differ in this respect even where the number of carbon atoms in the alkyl group is the same.

Phosphites where $n$ has average value of say 1.5 to 2.0 can contain mono-, di- and trialkylated phenyl groups. The proportions of tri- and dialkylated phenyl groups decrease as the average value of $n$ falls below 1.5, and mixtures where $n$ has a value of from 1 to say 1.2, may contain a small proportion of phosphites in which R is absent.

The alkyl group or groups R usually occupy ortho and/or positions relative to the oxygen atom through which the alkylphenyl group is attached to the phosphorus atom, but the phosphites of the invention include meta alkylated compounds.

Especially prefrred are posphites where R is an alkyl group containing from 7 to 11 carbon atoms or where the average number of carbon atoms in a group R is from 7 to 11; phosphites where $n$ has an average value of from 1.2 to 1.9, for example from 1.4 to 1.9; and phosphites where R' represents a hydrogen atom or a methyl group.

The new phosphites of the invention are (a) mixtures of tris(alkylphenyl)phosphites in which each alkylphenyl group has the Formula I above, $n$ in individual compounds is 1, 2 or 3 but in the mixture has an average value of from 1 to 2 and (b) phosphites and mixtures of phosphites of Formula II where A has the Formula III and X represents a phenylene or naphthylene group or a radical comprising two benzene nuclei linked directly or through an oxygen or sulfur atom or through an alkylene, alkylidene, carbonyl or sulfonyl group, each oxygen atom in the grouping —O—X—O— being linked to a nuclear carbon atom of X.

An emulsion of the invention can be prepared by the usual method for the preparation of oil-in-water emulsions, namely the vigorous agitation of the two liquid phases in the presence of an emulsifying agent. A range of emulsifying agents are suitable; the emulsifying agent can be anionic, for example an alkali metal salt of a long chain fatty acid (containing for example from 14 to 20 carbon atoms), for instance sodium stearate, potassium laurate, lithium stearate or potassium oleate. Other examples of anionic emulsifiers are sodium lauryl sulfate, sodium alkylnaphthalene sulfonate, sodium sulfosuccinate, and sodium castor oil sulfonate. Alternatively nonionic emulsifying agents can be used, including for example polyoxyethylene fatty alcohol ethers and esters, and polyoxypropylene polyol fatty acid esters.

Where the emulsion is to be used as a means of incorporating the phosphite stabilizer into an aqueous latex of a synthetic rubber which is subsequently coagulated, it is desirable that the conditions and reagents used to bring about coagulation should also break the emulsion. Coagulation of synthetic rubbers is usually effected by the addition of acids and/or salts, and the preferred emulsifying agents for use in the present invention are therefore the anionic emulsifiers, which are sensitive to electrolytes and acids. Most suitable are the alkali metal salts of long chain fatty acids such as sodium and potassium oleate.

The method of mixing the emulsion-forming components is not critical, but usually the emulsifier will be dissolved in the phosphite or the water, according to which has the more suitable solubility characteristics, before the liquid phases are mixed. Alternatively in appropriate instances, the emulsifier can be formed in situ; for example a very convenient method where the emulsifier is an alkali metal salt of a long chain fatty acid is to dissolve the acid in the phosphite and mix this solution under conditions of vigorous agitation with an aqueous solution of an alkali metal hydroxide containing the required amount of hydroxide to form the salt.

Stable emulsions having a range of proportions of phosphite to water can be prepared and are suitable for addition to rubber latices. Those skilled in the art will realize that the limits of stability will vary with the kind and amount of emulsifier used. Where the emulsifier is an alkali metal salt of a fatty acid however, the proportions by weight of phosphite to water may vary from 1:10 to 2:1 using an amount of emulsifier in a range of for instance 1% to 25% of the weight of the phosphite. Preferred emulsions contain phosphite and water in the range 1:8 to 1:1 and an amount of alkali metal fatty acid salt of from 2 to 20% of the weight of the phosphite.

An emulsion of the invention can optionally contain a thickening agent, for example an alkyl aryl polyether alcohol, casein or an alginate.

The usual method for the production of the phosphites of the invention involves the reaction of an alkylphenol of the formula

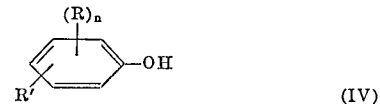

(IV)

where R, $n$ and R' have the same significance as before, and a phosphorus trihalide. For the production of phosphites of Formula II where A is an alkylphenyl group of Formula I corresponding to the alkylphenol (IV) a single-stage process comprising reacting a phosphorus trihalide, usually phosphorus trichloride, with 3 moles of alkyl phenol (IV) per mole of phosphorus trihalide can be used. Where A is other than an alkyl phenyl group derived from an alkyl phenol (IV), a bis(alkylphenyl)phosphohalidite is first formed as an intermediate by reacting two moles of an alkylphenol (VI) with one mole of phosphorus trihalide, and the intermediate is then reacted with phenol or an alkylphenol where A represents a phenyl or alkylphenyl group, or with a dihydric phenol HO—X—OH where X is a defined above.

Examples of alkylphenols that can be used for reaction with the intermediate bis(alkylphenyl)phosphohalidite include the cresols, ethylphenols, and t-butylphenols, and examples of dihydric phenols HO—X—OH include hydroquinone, 4,4'-dihydroxybiphenyl, 4,4'-isopropylidene bis-phenol, 4,4'-isopropylidene bis(o-cresol), 4,4'-dihydroxydiphenyl sulfide, 4,4'-dihydroxydiphenyl ether, 4,4'-dihydroxydiphenyl sulfone and 2,4'-dihydroxybenzophenone.

In a typical reaction between the alkylphenol (IV) and the phosphorus trihalide, the latter is phosphorus trichloride and is added to the former at a temperature within the range 50–100° C. When the addition is complete, the temperature can be raised, for example up to 200° C. and preferably to within the range 140–180° C., to complete the reaction and the removal of by-product hydrogen chloride. Similar conditions can be used for the reaction of an intermediate bis(alkylphenyl)phosphochloridite with phenol, an alkylphenol or bis(phenol). Preferably an overall slight excess of phenolic reactant or reactants is used to ensure that the final product is free from phosphorus trichloride or phosphochloridite. The reaction is preferably carried out in an inert atmosphere, for example an atmosphere of nitrogen, and if desired, an inert gas can be bubbled through the reaction mixture to assist in eliminating the hydrogen chloride.

Alternatively, the reactions involving phosphorus trichloride or the bis(alkylphenyl)phosphochloridite can be carried out in the presence of a substance which combines with the hydrogen chloride, for example a tertiary amine such as pyridine or triethylamine. The reaction medium in such cases is preferably diluted with an inert solvent. Although under these conditions the reaction proceeds more readily and at lower temperatures than in the procedure described above, the latter is economically the more attractive.

Phosphorus tribromide can be used in the above processes in place of phosphorus trichloride.

A critical feature of the phosphites of the present invention is the nature of the group R. Alkylphenols (IV) having groups R of the required structure can be made by the alkylation in the presence of an alkylation catalyst of phenol or an R'-substituted phenol, for example a cresol, ethylphenol, or isopropylphenol with a straight chain olefin, for example an α-olefin, containing from 6 to 12 carbon atoms per molecule or a mixture of straight chain olefin, for example an α-olefin, containing from atoms per molecule. Useful products are also obtained by the use of mixtures of straight chain olefins having an average of 6 to 12 carbon atoms per molecule and containing not more than 10% by weight of straight chain olefins with fewer than 6 carbon atoms per molecule and not more than 10% by weight of straight chain olefins with more than 12 carbon atoms per molecule. Secondary alcohols or mixtures of secondary alcohols corresponding to the straight chain olefins described above can also be used to produce the alkylphenols.

Preferred catalysts for a reaction using a straight chain olefin are acid-activated clays. These are clays, usually alumino-silicate clays, which have been activated by treatment with a strong acid, usually sulfuric acid or an organic sulfonic acid. The treatment results in absorption or adsorption of the acid by the clay, and the amount absorbed or adsorbed where the acid-activated clay is to be used as an alkylation catalyst is preferably from 2 to 15% by weight of the clay. The clay may be acid-activated before it is added to the alkylation mixture or it may be activated in situ. If activated in situ the clay is desirably dried beforehand until it contains from 5 to 8 weight percent water. After drying, the clay is put into the reactant mix together with from about .02 to 0.1 g. acid per g. of clay. When activated beforehand the clay is contacted with an anhydrous acid solution such as sulfuric acid in ether. The slurry is filtered and washed repeatedly with solvent to remove excess acid. After a brief drying the clay is a good catalyst without adding more acid.

The optimum temperature range for the alkylation using an acid-activated clay as catalyst is 140–150° C. At temperatures below 140° C. the amount of alkylaryl ether formed increases at the expense of the alkylphenol, while at temperatures much in excess of 1500 C. the risk of undesirable side reactions increases. Nevertheless, useful products containing major amounts of alkylphenols can be obtained by alkylation at temperatures outside the optimum range, for example within the broader range 120–180° C.

The optimum amount of activated clay catalyst depends on the particular clay and its acid content, but the amount is usually from 18 to 22% of the weight of the phenol to be alkylated. Lesser amounts can be used, for example down to 5% by weight of the phenol to be alkylated, but the reaction mixture then requires a longer holding period at the reaction temperature to come to equilibrium.

Other alkylation catalysts that can be used to prepare the alkylphenol starting materials include boron trifluoride, boron trifluoride complexes such as boron-trifluoride etherates and sulfuric acid.

The quantity of olefin used will vary according to the degree of alkylation required in the product. Under the optimum reaction conditions referred to above, the equilibrium reaction mixture contains very little unreacted olefin, so that secondary alkylphenols containing an average of from 1.4 to 1.9 alkyl groups per molecule of phenol, for instance, can be obtained by using from 1.5 to 2.0 moles of olefin per mole of phenol. With these ratios of reactants, the product is essentially an equilibrium mixture of mono-, di- and trialkylated phenol. The alkyl groups are for the most part present in the ortho and para positions, but some meta-alkylated phenols are formed with certain activated clay catalysts. Furthermore, the product, even when a single straight chain olefin is employed, is a mixture of secondary alkylphenols in which the point of attachment of the alkyl group to the phenol nucleus varies because the double bond of the olefin is mobile under the reaction conditions. For example, alkylation of phenol with α-heptene may give a mixture containing hept-2-yl-, hept-3-yl- and hept-4-ylphenols.

Where the required product is one which is homogeneous in respect of the number of alkyl groups in the alkylphenyl group I, i.e., $n$ is 1, or 3 the alkylation process is followed by separation of the product having the required value of $n$ from any by-product phenols having lower or higher values of $n$. Such separation may, for example, be by fractional distillation or by gas-liquid chromatography. Phenols where $n$ has the value 1 are the easiest to prepare in this way, because by the use of an excess of phenol or R'-substituted phenol in the alkylation reaction it is possible largely to suppress the formation of di- and tri-alkylated products.

Separation of individual isomers from alkylation mixtures is not easy, however, and it may be necessary to resort to indirect methods for the preparation of such compounds as exemplified more fully hereinafter.

The present invention further provides a composition comprising an unvulcanized rubber of a kind which, when unprotected, is subject to oxidative deterioration, and, as a stabilizer for the rubber, a phosphite of the invention.

The present stabilizers are particularly suitable for the preservation of rubbers that are produced by an aqueous emulsion polymerization process, for example styrene-butadiene rubber or butadiene-acrylonitrile rubber, and as indicated above, it is usual in such cases to formulate the stabilizer as an emulsion for addition to the rubber latex. Where the rubber is produced by polymerizing the appropriate monomer or monomers in solution, this solution can be treated with a solution of the stabilizer in a suitable solvent before the solid rubber is isolated. A further way in which a stabilizer can be incorporated into the rubber is by milling in the conventional manner.

The amount of the stabilizer used in the rubber can vary between wide limits, for example from 0.1 to 5 parts per 100 parts of rubber, but in general it has been found preferable to use from 0.2 to 3 parts by weight and particularly from 0.5 to 2.5 parts by weight, per hundred parts by weight of rubber polymer.

A synthetic rubber containing a stabilizer can be vulcanized by a conventional process appropriate to the particular synthetic rubber concerned.

DESCRIPTION OF THE PREFERRED EMBODIMENTS

The invention is illustrated by the following examples.

EXAMPLE 1

This example describes the production of a phosphite of the invention by the reaction of a bis(alkylphenyl) phosphochloridite and 4,4'-thiobisphenol.

(a) Production of secondary alkylphenols 448 grams of a mixture of $C_7$–$C_9$ α-olefins (4.0 moles assuming an average $C_8H_{16}$ composition) was added dropwise over 4 hours to a stirred suspension of 18.8 grams of Retrol Clay No. 6 in 188 grams (2.0 moles) of phenol at a temperature of 140° C. The mixture was heated for a further 1 hour, cooled, and the catalyst filtered off. 93.6 grams of unreacted olefin were distilled from the reaction mixture, indicating that 1.6 moles of olefin per mole of phenol had reacted. This was confirmed by a hydroxyl determination on the alkylphenol thus produced.

(b) Production of the phosphite 276.8 grams (1.0 mole) of the alkylphenols were heated to between 70° C. and 80° C. with stirring and in a nitrogen atmosphere whilst 68.7 grams (0.5 mole) of phosphorus trichloride were added dropwise over 1 hour. Hydrogen chloride was collected in a water trap and the reaction at 70–80° C. was continued until substantially 1.0 mole was evolved corresponding to the formation of bis($C_7C_9$ - sec - alkylphenyl) phosphochloridite. 54.5 grams of 4,4'-thiobisphonel (0.25) mole) were then added and the mixture was heated to 150° C. until after 30 hours the evolution of hydrogen chloride had stopped. The phosphite thus produced contained 3.80% of phosphorus and was a pale brown oil with a viscosity of 20 poise at 20° C. (determined by comparison with P.R.S. bubble viscometer standards).

The phosphites of the present invention are, as stated above, unusual by virtue of their relatively low viscosity. For instance an analogous phosphite prepared in the manner described above, but using alkylphenols obtained by alkylating phenol with propylene trimer was an oil having a viscosity greater than 200 poise.

EXAMPLE 2

This example describes the production of a phosphite of the invention from phosphorus trichloride and a mixture of secondary akylphenols.

(a) Preparation of secondary alkylphenols

An acid-activated clay known as Retrol 6 (169.5 g.) was dried at 100° C. overnight and then stirred with phenol 846 g. (9.0 mole) at 140°–145° C. Octene-1 (1764 g. 15.75 mole) was added dropwise over 4 hours and the mixture stirred for a further 2 hours at 140–150° C. The mixture cooled overnight and the catalyst was filtered from the cold reaction product to give an oil with a green fluorescence (2754 g.). The oil was heated to a flask temperature of 160° C. at 25 mm. and 73.2 g. of olefin recovered. The weight of residual alkyl phenol was 2,354 g. The molecular weight, calculated from the yield, was 282, corresponding to an average of 1.67 alkyl groups per molecule.

Samples were titrated in ethylene diamine with potassium methoxide solution using o-nitroaniline as indicator (J. S. Fritz and R. T. Keen, Anal. Chem. 1953 (25) 179) and the equivalent weight found to be 304.6.

(b) Preparation of phosphites

The alkyl phenol (913.8 g., 3 equivalents) was heated to 70–80° C. with stirring and with a stream of nitrogen passing thorugh the liquid while phosphorus trichloride (137.3 g., 1.0 mole) was added over 3 hours. Hydrogen chloride evolved was trapped in water. After 2.8 moles of hydrogen chloride had been evolved the reaction temperature was raised to 160–170° C. until no more hydrogen chloride was collected in the water trap. A total of 3.02 moles of hydrogen chloride was obtained.

The product was a yellow oil with a pale green fluorescence which had a viscosity, as determined with the P.R.S. bubble viscometer, of 2.5 poise. The calculated phosphorus content was 3.29%, and 3.64% was found by analysis.

EXAMPLE 3

This example describes the production of a phosphite of the invention by the reaction of a bis(alkylphenyl) phosphochloridite and 4,4'-isopropylidene bisphenol (bisphenol A).

700 grams (2.3 moles) of the secondary alkyl phenols of Example 2 were heated to 70–80° C. with stirring and a stream of nitrogen passing through the liquid while phosphorus trichloride (157.9 g., 1.15 mole) was added over 3 hours. Hydrogen chloride evolved was trapped in the water. After substantially 2.3 mole of hydrogen chloride had been obtained the reaction mixture was cooled to 30° C. and bisphenol A (131.1 g., 0.575 mole) added. The mixture was slowly heated to 150–160° C. to minimize frothing and held at 150–160° C. until a total of 3.35 mole of HCl was obtained.

The product was a clear, amber liquid with a viscosity, as determined by the P.R.S. bubble viscometer, of 15 poise. The calculated phosphorus content was 4.13% and 4.03% was found by analysis.

EXAMPLE 4

A phosphite of the invention was obtained using essentially the same procedure as that of Example 3 but with 4,4'-thiobisphenol as starting material in place of bisphenol A.

The product was a clear amber liquid with a pale green fluoroescence with a viscosity of 15 poise. The calculated phosphorus content was 4.15% and 4.36% was found by analysis.

EXAMPLE 5

This example describes the preparation of a phosphite of the invention from phosphorus trichloride and a mixture of secondary alkylphenols having a different average number of alkyl substituents per molecule from the alkylphenols used in the previous examples.

(a) Preparation of the secondary alkylphenols

The procedure was essentially the same as that of Example 2 using phenol (846 g., 9.0 mole), octene-1 (1548 g., 13.5 mole) and Retrol 6 (169.2 g.). The molecular weight of the product, calculated from the yield, was 258.4 (i.e. 1.464 moles olefin reacted per mole of phenol). The equivalent weight, determined by titration, was 273. The latter value was used to calculate the amount of PCl₃ required to make the phosphite.

(b) Preparation of phosphite

The experimental procedure was essentially the same as in Example 2. The quantities used were, alkyl phenol 819 g. (3.0 equivalent); and phosphorus trichloride 137.3 g. (1.0 mole). The product was a clear amber liquid with a pale green fluorescence and a viscosity of 2 poise. The calculated phosphorus content was 3.66% and 3.84% was found by analysis.

EXAMPLE 6

By a procedure essentially the same as that of Example 3, a phosphite product was obtained from 655 grams (2.4 equivalents) of the alkylphenols of Example 5; phosphorus trichloride 164.8 g. (1.2 mole) and bisphenol A 132.8 g. (0.6 mole). A total of 3.71 mole of HCl was evolved and the product was a clear amber liquid with a viscosity of 25 poise. The calculated phosphorus content was 4.51% and 4.7% was found by analysis.

EXAMPLE 7

By a procedure essentially the same as that of Example 4, a phosphite product was obtained from 655 grams (2.4 equivalents) of the alkylphenols of Example 5, phosphorus trichloride 164.8 g. (1.2 mole) and 4,4'-thiobisphenol 130.8 g. (0.6 mole). A total of 3.63 mole of HCl was evolved and the product was a clear amber liquid with a viscosity of 10 poise. The calculated phosphorus content was 4.54% and 4.76% was found.

EXAMPLE 8

This example describes the evaluation of the phosphites of the previous examples as stabilizers for synthetic rubber.

The method used was as follows. An emulsion of the phosphite was prepared by adding a solution of 1.0 gram of oleic acid in 25 grams of the phosphite a vigorously stirred mixture of 4.0 ml. of N NaOH in 71 ml. of distilled water. 4.0 grams of this emulsion were added to 440 ml. of an unstabilized 1502 SBR latex and the mixture stirred at 50° C. while 147 ml. of a 12.5% solution of sodium chloride was added to cream the latex. To the creamed latex were added 200 ml. of a 0.5% solution of sulfuric acid to cause coagulation, and the crumb was washed with several changes of distilled water until it was free of chloride ion. The washed crumb was wrung free of water and dried in an airtight oven for two hours at 100° C. The dried crumb was sheeted out on an unheated rubber mill to give samples 4 mm. thick containing 1 phr. of stabilizer, and the samples were then placed in an air oven at 70° C. or at 130° C. Individual samples were taken from the oven at intervals and their gel contents determined by weighing accurately about 0.3 grams of the sample and suspending in a small basket of stainless steel gauze in pure benzene in the dark for 48 hours at room temperature. The material which remained insoluble at the end of this time was regarded as gel, and its weight was determined after draining the benzene and drying at 100° C. for 1 hour. This determination was carried out in duplicate, and the figures reported in the table below are average.

In a comparative test using a latex to which no stabilizer was added, cracking and hardening of the surface and resinification of the samples was observed during the period of drying for two hours at 100° C.

| Stabilizer | Percent gel in samples at 130° C. after— | | | | | |
|---|---|---|---|---|---|---|
| | 0 hrs. | 2 hrs. | 4 hrs. | 6 hrs. | 8 hrs. | 10 hrs. |
| Example 1 | None | 5 | 10 | 13 | 14 | 15 |

| | Percent gel in sample at 70° C. after— | | |
|---|---|---|---|
| | 7 days | 10 days | 14 days |
| Example 2 | 0.7 | 0.7 | 0.9 |
| Example 3 | 0.8 | 0.6 | 0.8 |
| Example 4 | 0.7 | 0.7 | 0.8 |

These results, when compared with the behavior of samples derived from unstabilized latex, show the effectiveness of the phosphites of the invention as stabilizers for styrene-butadiene rubber.

EXAMPLE 9

This example gives the method used and the results obtained in assessing the resistance of the phosphites to hydrolysis.

An emulsion of the phosphite was prepared as described in the previous example, and after buffering to pH 11.0 was stored at 50° C. Samples were withdrawn at intervals and titrated against 0.5 N sodium hydroxide solution. The percentage hydrolysis was obtained by applying the equation:

$$\text{Percent hydrolysis} = \frac{387.5 \times T}{W \times P}$$

where
$T$ = titer of 0.5 N NaOH per 100 ml. of emulsion
$W$ = weight of stabilizer in 750 grams of emulsion
$P$ = percent phosphorus in the stabilizer In a comparative experiment, tris(nonylphenyl)phosphite in which the nonyl group was derived from propylene trimer and contained a preponderance of tertiary carbon atoms was used as the stabilizer. The results are given in the following table:

| Stabilizer | Percent phosphorus | Percent hydrolysis occurring in— | | | | |
|---|---|---|---|---|---|---|
| | | 1 day | 2 days | 3 days | 4 days | 7 days |
| Tris(nonylphenyl)phosphite | 3.35 | 53.7 | 58.0 | + | + | + |
| Example 1 | 3.80 | 2.08 | 2.54 | 3.45 | − | 6 0 |
| Example 2 | 3.29 | 0.0 | − | 0.46 | 0.64 | 1.01 |
| Example 3 | 4.03 | 0.59 | 1.17 | 1.25 | 1.67 | 1.84 |
| Example 4 | 4.36 | 3.91 | 5.45 | 6.52 | 7.14 | 8.82 |
| Example 5 | 3.84 | 0.61 | 1.05 | 1.31 | 2.62 | 1.75 |
| Example 6 | 4.76 | 0.29 | 1.08 | 1.37 | 2.24 | 2.24 |
| Example 7 | 4.76 | 3.67 | 4.96 | 5.67 | 7.73 | 8.23 |

+ The emulsion had broken and the liquid had pH 2.0.
− A representative sample could not be obtained.

The markedly better resistance to hydrolysis of the phosphites of the invention compared with the tris(nonylphenyl)phosphite containing branched chain nonyl groups is apparent.

EXAMPLE 10

This example describes the production of a phosphite of the invention by the reaction of bis(mono-octylphenyl)phosphochloridite with 4,4'-isopropylidene bisphenol.

The mono-octylphenol was first prepared as follows:

224 grams (2 moles) of octene-1 were added during 4¼ hours to a stirred suspension of 73.6 grams of Retrol clay in 376 grams (4 moles) of phenol at 140–145° C. in an atmosphere of nitrogen. The temperature was maintained and stirring was continued for a further 2 hours, after which the product was cooled and filtered. Distillation of the filtrate gave phenol followed by mono-octylphenol having a boiling range of 138–150° C. at a pressure of 7 mm. of mercury.

53.7 grams of phosphorus trichloride were added during 4 hours to 194 grams of the mono-octylphenol stirred at 70–80° C. in a reactor through which a stream of nitrogen was passed. Hydrogen chloride evolved in the reaction was entrained in the nitrogen and the course of the reaction was followed by periodically estimating the hydrogen chloride content of the gas stream. The amount of hydrogen chloride corresponding to the formation of bis(mono-octylphenyl)phosphochloridite had been evolved after 5 hours.

57 grams of 4,4'-isopropylidene bisphenol were then added to the reaction mixture, the temperature of which was gradually raised to 145–150° C. Evolution of hydrogen chloride was substantially complete after 56 hours. The product was a colorless mobile liquid weighing 258 grams.

EXAMPLE 11

Tris(octylphenyl)phosphite was obtained from phosphorus trichloride and the mono-octylphenol described in Example 10, by essentially the same process as that described in Example 2. The hydrolytic stability of the product in aqueous emulsion was assessed by the method of Example 9. The phosphite was only 0.9% hydrolyzed after 11 days storage of the emulsion at 50° C. showing that it had very good hydrolytic stability.

EXAMPLE 12

Tris(octylphenyl)phosphite was obtained from phosphorus trichloride and mono-octylphenol by essentially the same process as that of the previous example, but the octylphenol was first prepared as follows:

398 grams (3.5 moles) of octene-1 were added over a period of 2 hours to a stirred solution of 33 grams of boron trifluoride etherate in 239 grams (3.5 moles) of phenol at 85–90° C. in an atmosphere of nitrogen. Stirring was continued for a further 24 hours at 85–90° C. after the addition was complete. The product was then distilled to recover starting materials and to give a mono-octylphenol fraction having a boiling range of 156–174° C. at a pressure of 13 mm. of mercury.

Gas-liquid chromatographic analysis of the mono-octylphenol showed that its composition was essentially the same as the mono-octylphenol of Example 1, and that in both, the ortho-substituted isomers predominated.

EXAMPLE 13

Phenol was alkylated with a mixture of $C_8$ to $C_{10}$ straight chain mono-olefins using a molar ratio of olefin to phenol of approximately 1.8 to 1 in the presence of a Retrol clay catalyst. The product contained an average of 1.5 alkyl groups per alkylphenol molecule, and was used together with 4,4'-isopropylidene bisphenol and phosphorus trichloride to prepare a phosphite by essentially the same method as that described in Example 3.

The phosphite was an oil with a viscosity of 20 poise at 20° C. Evaluation of its resistance to hydrolysis by the method of Example 9 gave a result of 2.4% hydrolyzed after 9 days.

For comparison, an analogous phosphite was prepared from phosphorus trichloride, 4,4'-isopropylidene bisphenol and a nonyl phenol obtained by alkylating phenol with propylene trimer and containing an average of 1.5 nonyl groups per molecule. The phosphite had too high a viscosity to be measured on the instrument used to measure the viscosity of the phosphite of the invention above, and in aqueous emulsion was 49% hydrolyzed after 1 day at 50° C.

EXAMPLE 14

Phenol was alkylated with two different proportions of octene-1 using a Retrol clay catalyst, and the products were used, together with phosphorus trichloride and 4,4'-isopropylidene bisphenol, to make phosphite esters by essentially the same method as that described in Example 3.

Properties of the products, denoted I and II, are shown in the following table. The average values of $n$ in the octylphenol starting materials were respectively 1.3 and 1.6.

| Phosphite | Percent P | Viscosity (poise) | Percent hydrolysis after 7 days at 50° C. |
|---|---|---|---|
| I | 5.28 | 25 | 3.0 |
| II | 4.80 | 25 | 2.7 |

EXAMPLE 15

O-(1-methylheptyl)phenol was synthesized by reacting the Grignard derivative of o-bromoanisole with methyl heptyl ketone to give 2-(o-methoxyphenyl)octan-2-ol, dehydrating the alcohol and hydrogenating the product to O-(1-methylheptyl)anisole, followed by demethylation of the anisole.

A phosphite of the invention was prepared from o-(1-methylheptyl)phenol, phosphorus trichloride and 4,4'-isopropylidene bisphenol by the method of Example 3. The product was a colorless, mobile liquid having a phosphorus content of 5.75% compared with a theoretical phosphorus content for $C_{71}H_{98}O_6P_2$ of 5.59%. An aqueous emulsion of the product was 4% hydrolyzed after 7 days at 50° C.

EXAMPLE 16

The procedure of Example 14 was repeated using p-(1-methylheptyl)phenol in place of o-(1-methylheptyl)phenol. The product was a colorless, mobile liquid having a phosphorus content of 5.55%.

EXAMPLE 17

Phenol was alkylated with decene-1 using a Retrol clay catalyst to give a product containing an average of 1.5 decyl groups per decylphenol molecule. The decylphenol was used with phosphorus trichloride and 4,4'-isopropylene bisphenol to prepare a phosphite ester by the method of Example 3. The phosphite was a liquid having a viscosity of 20 poise at 20° C. and a phosphorus content of 4.31%. An aqueous emulsion of the phosphite was 3.8% hydrolyzed after 7 days at 50° C.

EXAMPLE 18

The procedure of Example 16 was repeated using hexene-1 in place of decene-1. The phosphite was a liquid having a phosphorus content of 5.55%. An aqueous emulsion of the phosphite was 3.7% hydrolyzed after 7 days at 50° C.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A stabilized latex of synthetic rubber of a kind which when unprotected is subject to oxidative deterioration selected from the group consisting of styrene-butadiene rubber and butadiene-acrylonitrile rubber having emulsified therein a stabilizing amount of a phosphite ester characterized by the presence in the molecule of an alkylphenyl group of the formula

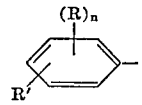

linked through an oxygen atom to a phosphorus atom, where R is an alkyl group containing from 6 to 12 carbon atoms that is attached at a secondary carbon atom to the benzene nucleus but is otherwise free of branching in the carbon chain, $n$ is 1, 2 or 3 and R' represents hydrogen or alkyl of 1 to 3 carbon atoms which ester has the formula $(AO)_2POXOP(OA)_2$ where A is the aforesaid alkylphenyl group and X is a divalent bridging group selected from the group consisting of phenylene, naphthylene and two benzene nuclei linked directly or through oxygen, sulfur, alkylene, alkylidene, carbonyl or sulfonyl and each oxygen atom of —O—X—O— is linked to a nuclear carbon atom X.

2. Latex according to claim 1, in which the synthetic rubber is styrene-butadiene rubber.

3. A synthetic rubber that has been obtained by coagulating and drying the latex of claim 1.

4. A stabilized latex of claim 1 wherein the phosphite ester is present in an amount such that 0.1 to 5 parts by weight are present per 100 parts by weight of rubber polymer.

5. Latex according to claim 4 in which the synthetic rubber is styrene-butadiene rubber, R' is hydrogen and X is 4,4'-isopropylidene bis(phenylene).

6. A synthetic rubber that has been obtained by coagulating and drying the latex of claim 4.

7. Latex according to claim 4 in which the synthetic rubber is styrene-butadiene rubber, R' is hydrogen and X is 4,4'-thiobis(phenylene).

8. Latex of claim 1 wherein the stabilizer is a mixture of phosphite esters, $n$ in the individual components being 1, 2 or 3 but in the mixture has an average value of 1 to 2 and R' is hydrogen.

9. Latex of claim 8 where $n$ has an average value of 1.4 to 1.9.

References Cited

UNITED STATES PATENTS

| | | | |
|---|---|---|---|
| 2,733,226 | 1/1956 | Hunter | 260—45.7 P |
| 3,435,097 | 3/1969 | Bottomley | 260—45.95 |
| 3,448,179 | 6/1969 | Gordan | 260—930 |
| 3,484,506 | 12/1969 | Baranauckas | 260—930 |

THEODORE MORRIS, Primary Examiner

U.S. Cl. X.R.

260—45.7 P, 930